US012658655B2

(12) United States Patent
Liu et al.

(10) Patent No.: US 12,658,655 B2
(45) Date of Patent: Jun. 16, 2026

(54) TOOL-FREE MOUNTING STRUCTURE FOR FAN CONNECTOR

(71) Applicant: INSPUR SUZHOU INTELLIGENT TECHNOLOGY CO., LTD., Jiangsu (CN)

(72) Inventors: Tao Liu, Jiangsu (CN); Lesen Zhao, Jiangsu (CN); Lingyan Wang, Jiangsu (CN); Xuejun Teng, Jiangsu (CN); Yonghao Ma, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 403 days.

(21) Appl. No.: 18/254,921

(22) PCT Filed: Dec. 30, 2021

(86) PCT No.: PCT/CN2021/143272
§ 371 (c)(1),
(2) Date: May 30, 2023

(87) PCT Pub. No.: WO2022/148303
PCT Pub. Date: Jul. 14, 2022

(65) Prior Publication Data

US 2024/0030663 A1 Jan. 25, 2024

(30) Foreign Application Priority Data

Jan. 7, 2021 (CN) ......................... 202110019289.1

(51) Int. Cl.
*H01R 13/74* (2006.01)
*H01R 13/627* (2006.01)
*H01R 13/631* (2006.01)

(52) U.S. Cl.
CPC ......... *H01R 13/74* (2013.01); *H01R 13/6273* (2013.01); *H01R 13/631* (2013.01)

(58) Field of Classification Search
CPC ............................ H01R 13/74; H01R 13/6273
(Continued)

(56) References Cited

U.S. PATENT DOCUMENTS 5,338,229 A * 8/1994 Egenolf ................. H01R 13/18 439/839
2005/0255740 A1* 11/2005 Katsuma ............. H01R 13/629 439/489
(Continued)

FOREIGN PATENT DOCUMENTS

CN 202712464 U 1/2013
CN 105208836 A 12/2015
(Continued)

OTHER PUBLICATIONS

Search report for PCT/CN2021/143272 mailed on Mar. 16, 2022.
Search report for Chinese application 202110019289.1 filed on Jan. 7, 2021.

*Primary Examiner* — Tulsidas C Patel
*Assistant Examiner* — Thaslimur Rahman
(74) *Attorney, Agent, or Firm* — Dennemeyer & Associates LLC

(57) ABSTRACT

The present application discloses a tool-free mounting structure for a fan connector. The mounting structure includes a fan frame and a fan connector, the fan connector including a male connector and a female connector, a front side wall of the fan frame being provided with a first avoiding hole, and a front end of the female connector extending to a front side of the fan frame through the first avoiding hole. A rear end of the female connector is provided with a limiting structure, the female connector is provided with a first limiting column, the front side wall of the fan frame is
(Continued)

sandwiched between the first limiting column and the limiting structure, and the front side wall of the fan frame is provided with a second avoiding hole configured to allow the first limiting column to pass through.

19 Claims, 10 Drawing Sheets

(58) Field of Classification Search
USPC .................................................. 439/345, 545
See application file for complete search history.

(56) References Cited

U.S. PATENT DOCUMENTS

| | | | | |
|---|---|---|---|---|
| 2009/0209124 A1* | 8/2009 | Klein | .................. | H01R 13/631<br>439/157 |
| 2015/0380850 A1* | 12/2015 | Tanigawa | ............ | H01R 13/745<br>439/676 |
| 2021/0226368 A1* | 7/2021 | Hung | .................... | H01R 12/72 |

FOREIGN PATENT DOCUMENTS

| | | | | |
|---|---|---|---|---|
| CN | 206962120 | U | | 2/2018 |
| CN | 207766536 | U | | 8/2018 |
| CN | 110389638 | A | | 10/2019 |
| CN | 110600941 | A | | 12/2019 |
| CN | 210351961 | U | * | 4/2020 |
| CN | 111829091 | A | | 10/2020 |
| CN | 112838436 | A | | 5/2021 |
| EP | 1569305 | A1 | | 8/2005 |

* cited by examiner

TOOL-FREE MOUNTING STRUCTURE FOR FAN CONNECTOR

CROSS-REFERENCE TO RELATED APPLICATIONS

This is a 35 U.S.C. 371 National Stage Patent Application of International Application No. PCT/CN2021/143272, filed Dec. 30, 2021, which claims priority to Chinese application 202110019289.1, filed Jan. 7, 2021, each of which is hereby incorporated by reference in its entirety.

TECHNICAL FIELD

The present application relates to the field of server devices, in particular to a tool-free mounting structure for a fan connector.

BACKGROUND

In order to improve a reliability design of existing servers, a system fan usually adopts an online thermal maintenance design, that is, a female connector of a fan connector is directly fixed to a fan frame, and a male connector of the fan connector is fixed to a mainboard end.

In the related art, the female connector of the fan connector is usually fixed by a screw connection, the female connector of each fan connector requires at least four screws for fixing, and mounting and dismounting require tools such as a screwdriver, which is not conducive to the improvement of the production efficiency and is also not conducive to later maintenance, and a mounting process is relatively complex and tedious.

In addition, in the conventional fan connector, in order to ensure the reliability of contact when a PIN is plugged into a female connector terminal, a contact protrusion is provided on an inner side surface of the female connector terminal, and the reliability of the contact is achieved through a press fit between the PIN and the female connector terminal. In this solution, although the reliability of the contact is ensured, the insertion and extraction force are too large, which makes the mounting inconvenient and maintenance in the future even more inconvenient.

SUMMARY

In view of the above-mentioned problems, the present application provides a tool-free mounting structure for a fan connector. The mounting structure achieves the tool-free mounting of a female connector of the fan connector, a fixing structure is reliable and the insertion and extraction force is small, thereby facilitating the improvement of the working efficiency, and the subsequent maintenance.

The technical solution adopted by the present application to solve the technical problem thereof is as follows.

A tool-free mounting structure for a fan connector includes a fan frame and a fan connector, the fan connector including a male connector and a female connector, a front side wall of the fan frame is provided with a first avoiding hole, and a front end of the female connector extending to a front side of the fan frame through the first avoiding hole.

A rear end of the female connector is provided with a limiting structure, a position, located at a front side of the limiting structure, on the female connector is provided with a first limiting column, the front side wall of the fan frame is sandwiched between the first limiting column and the limiting structure, and the front side wall of the fan frame is provided with a second avoiding hole configured to allow the first limiting column to pass through.

Left and right ends of a rear side surface of the male connector are respectively provided with a second inclined guide surface cooperated with the female connector.

In some embodiments, left and right ends of upper and lower side surfaces of the female connector are respectively provided with the first limiting column extending in a vertical direction.

In some embodiments, a projection of the first limiting column in a horizontal plane is square, and a right side of a rear side surface of the first limiting column is provided with a first inclined guide surface.

In some embodiments, a right side surface of the limiting structure is provided with an elastic fixing plate, the elastic fixing plate is provided with a positioning protrusion, the front side wall of the fan frame is provided with a positioning groove or a positioning hole cooperated with the positioning protrusion, and a position, located between the limiting structure and the first limiting column, on a right side surface of the female connector is provided with an elastic sheet.

In some embodiments, the female connector is provided with a first mounting hole extending in the vertical direction, the right side surface of the female connector is provided with a fourth avoiding hole, the elastic sheet is provided in the first mounting hole, and an arc-shaped part of the elastic sheet protrudes out to an exterior of the female connector through the fourth avoiding hole.

In some embodiments, upper and lower ends of the arc-shaped part of the elastic sheet are respectively provided with a sliding part which is folded inward and extends in the vertical direction.

In some embodiments, left and right sides of the female connector are respectively provided with an elastic clamping plate, the elastic clamping plate is provided with a first clamping part, and left and right sides of the male connector are respectively provided with a second clamping part cooperated with the first clamping part.

In some embodiments, the left and right sides of the male connector are respectively provided with a groove, and the second clamping part is provided on a bottom surface of the groove.

In some embodiments, the female connector is provided with a female connector terminal, left and right sides of a front end of the female connector terminal are respectively provided with a fifth avoiding hole, and a rear side surface of the fifth avoiding hole is provided with an elastic contact plate configured to clamp a PIN.

In some embodiments, a front side of the male connector is fixedly provided with a pin fixing plate, and the pin fixing plate is provided with a jack configured to accommodate the PIN.

In the figures: 1—fan frame, 11—first avoiding hole, 12—second avoiding hole, 13—third avoiding hole,

2—female connector, 21—female connector body, 211—first limiting column, 2111—first inclined guide surface, 212—first mounting hole, 213—fourth avoiding hole, 221—baffle, 222—second limiting column, 223—limiting plate, 23—elastic fixing plate, 231—positioning protrusion, 24—elastic sheet, 25—elastic clamping plate, 251—first clamping part, 26—plugging column, 27—female connector terminal, 271—elastic contact plate,

3—male connector, 311—second inclined guide surface, 312—groove, 3121—second clamping part, 313—fixing column, 314—jack, 32—PIN, 33—pin fixing plate.

DETAILED DESCRIPTION OF THE EMBODIMENTS

Figure 1:
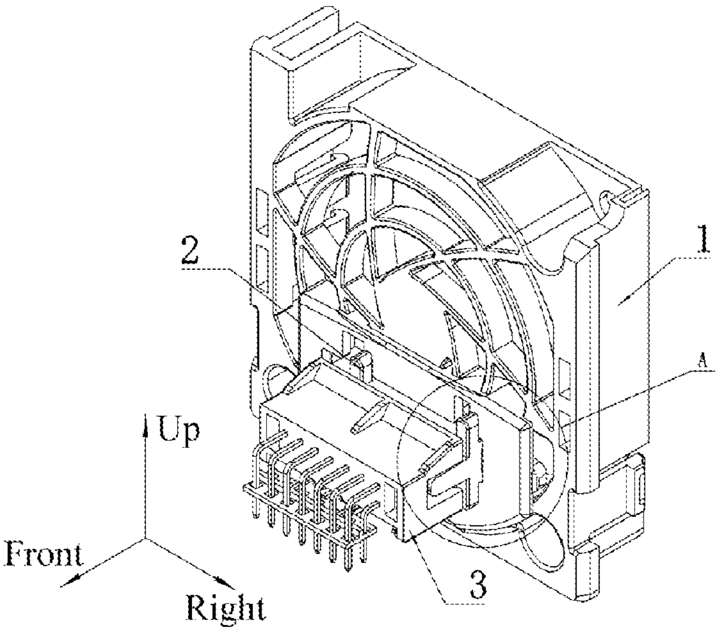
FIG. 1 is a three-dimensional structure diagram of a mounting structure.

For ease of description, a coordinate system is defined as shown in FIG. 1, with a left-right direction as a transverse direction, a front-rear direction as a longitudinal direction, and an up-down direction as a vertical direction.

As shown in FIG. 1, a tool-free mounting structure of a fan connector includes a fan frame 1 configured to mount a fan and a fan connector provided on the fan frame 1, the fan connector including a male connector 3 and a female connector 2. The male connector 3 is fixedly provided on a mainboard (not shown in the figure), and the female connector 2 is fixedly provided on the fan frame 1.

Figure 8:
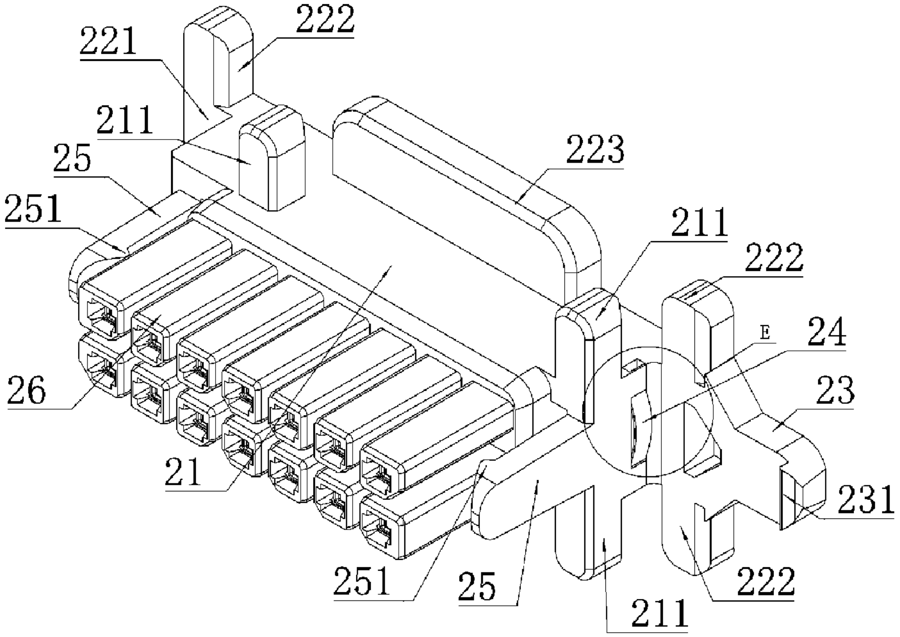
FIG. 8 is a three-dimensional structure diagram of a female connector of a fan connector.

As shown in FIG. 8, the female connector 2 of the fan connector includes a female connector body 21. A front side surface of the female connector body 21 is provided with plurality of plugging columns 26 extending forward in the longitudinal direction, and in some embodiments, the plurality of plugging columns 26 are arranged in a matrix. A front end surface of the plugging column 26 is provided with a second mounting hole extending backward in the longitudinal direction, and the second mounting hole successively penetrates through the plugging column 26 and the female connector body 21 from front to back. A female connector terminal 27 is provided in the second mounting hole.

Figure 3:
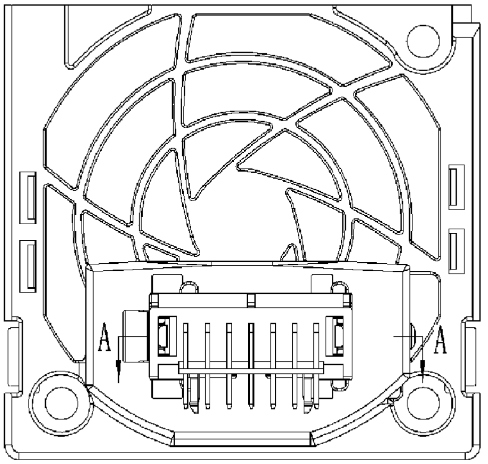
FIG. 3 is a front view of the mounting structure.
Figure 4:
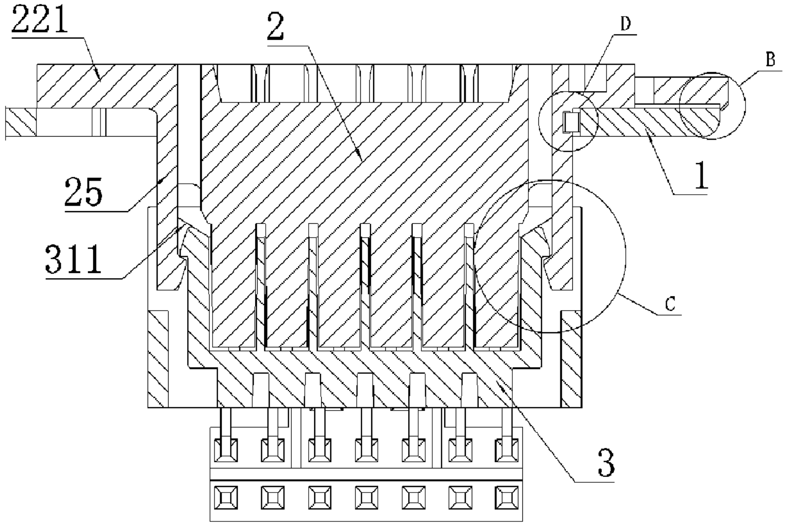
FIG. 4 is an A-A cross-sectional view in FIG. 3.
Figure 17:
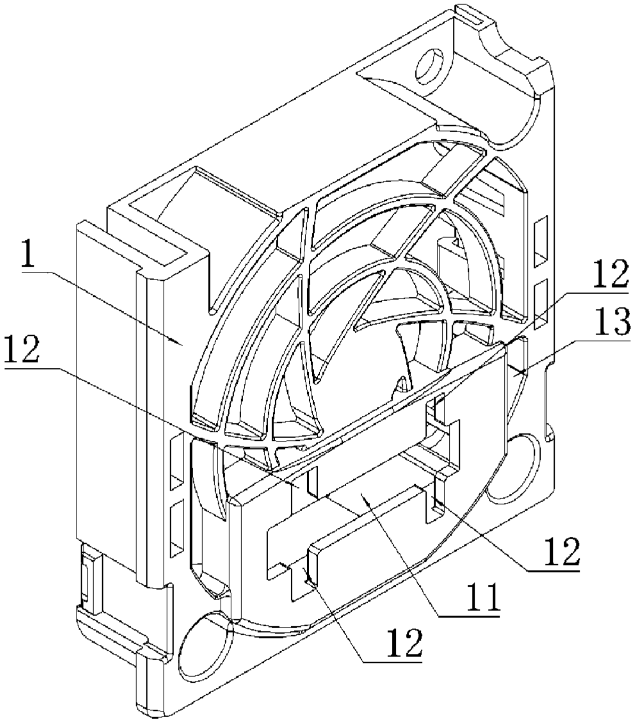
FIG. 17 is a three-dimensional structure diagram of a fan frame.

As shown in FIGS. 3 and 4, a plugging end of the fan connector extends to a front side of the fan frame 1 through a front side wall of the fan frame 1, and as shown in FIG. 17, the front side wall of the fan frame 1 is provided with a rectangular first avoiding hole 11 configured to accommodate the female connector body 21. A rear side of the female connector body 21 is provided with a limiting structure, and when the female connector 2 is mounted on the fan frame 1, a front side surface of the limiting structure is attached to a rear side surface of the front side wall of the fan frame 1. A position, located at a front side of the limiting structure, of a connecting end of the female connector 2 is provided with a first limiting column 211, when the female connector 2 is mounted on the fan frame 1, the front side wall of the fan frame 1 is sandwiched between the first limiting column 211 and the limiting structure, and the female connector 2 may slide left and right with respect to the fan frame 1 under a guide action of the first limiting column 211 and the limiting structure. As shown in FIG. 17, accordingly, the front side wall of the fan frame 1 is provided with a second avoiding hole 12 configured to accommodate the first limiting column 211. The first avoiding hole 11 and the second avoiding holes 12 together form an avoiding mounting groove penetrating through the front side wall in the front-rear direction.

In some embodiments, as shown in FIG. 8, left and right ends of upper and lower side surfaces of the female connector body 21 are respectively provided with the first limiting column 211 extending in the vertical direction, accordingly, an upper edge and a lower edge of the first avoiding hole 11 are respectively provided with two rectangular second avoiding holes 12, and the second avoiding holes 12 are perpendicular to the first avoiding hole 11.

In some embodiments, as shown in FIG. 8, the limiting structure includes a baffle 221. The dimension of the baffle 221 in the transverse direction is greater than the dimension of the female connector body 21 in the transverse direction, an upper side surface of the baffle 221 is coplanar with the upper side surface of the female connector body 21, and a lower side surface of the baffle 221 is coplanar with the lower side surface of the female connector body 21. Left and right ends of the upper side surface and the lower side surface of the baffle 221 are respectively provided with a second limiting column 222 extending in the vertical direction, and the second limiting column 222 is located at an outer side of the first limiting column 211 (the side near the middle of the connecting end of the female connector 2 is an inner side).

In some embodiments, as shown in FIG. 8, the upper side surface and the lower side surface of the baffle 221 are respectively provided with a limiting plate 223 located between two second limiting columns 222.

Figure 18:
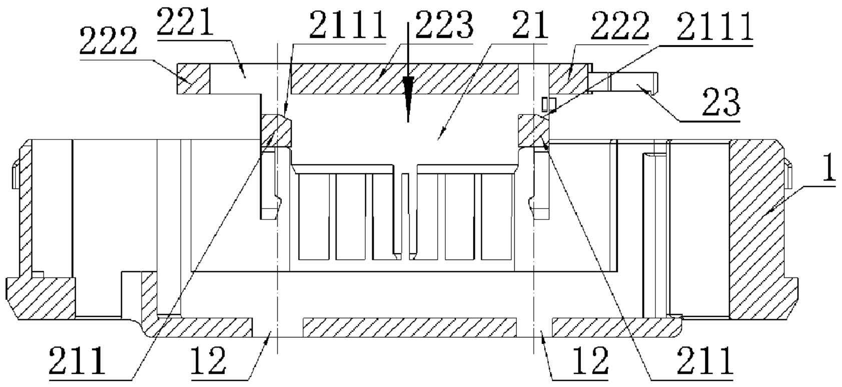
FIG. 18 is a first mounting process diagram of the female connector.
Figure 19:
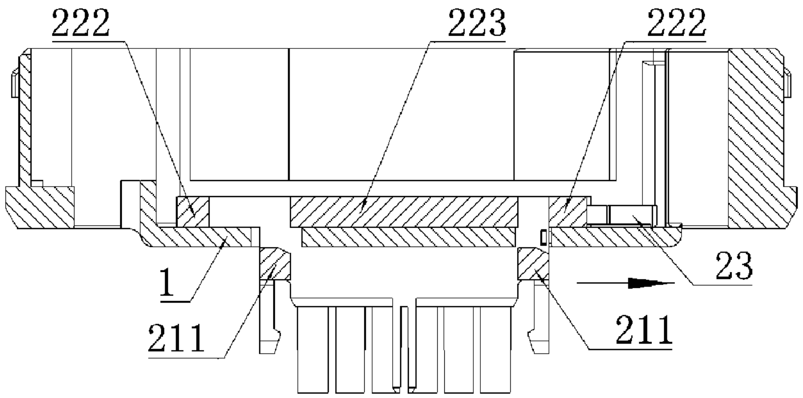
FIG. 19 is a second mounting process diagram of the female connector.
Figure 20:
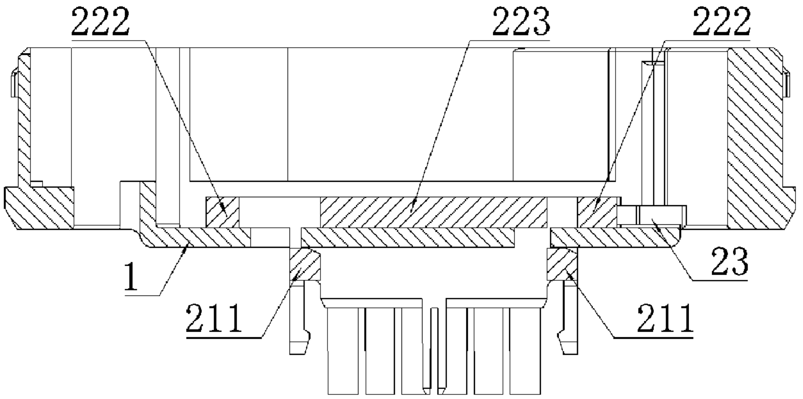
FIG. 20 is a third mounting process diagram of the female connector.

A mounting process of the female connector 2 is as shown in FIGS. 18, 19 and 20. Firstly, the female connector 2 is moved to a rear side of the fan frame 1, and the first limiting column 211 of the female connector 2 is aligned with the second avoiding hole 12 of the fan frame 1, and the female connector body 21 of the female connector 2 is aligned with the first avoiding hole 11 of the fan frame 1. Then, the female connector 2 is moved forward until front side surfaces of the second limiting column 222 and the limiting plate 223 are attached to the rear side surface of the front side wall of the fan frame 1, namely, a state as shown in FIG. 19. Then, the female connector 2 is pushed rightward, so that the first limiting column 211 and the second avoiding hole 12 are misaligned until the front side wall of the fan frame 1 is sandwiched between the first limiting column 211 and the second limiting column 222, namely, a state as shown in FIG. 20.

In some embodiments, as shown in FIGS. 18, 19 and 20, projections of the first limiting column 211 and the second limiting column 222 in a horizontal plane are square, and a right side of a rear side surface of the first limiting column 211 is provided with a first inclined guide surface 2111.

Figure 11:
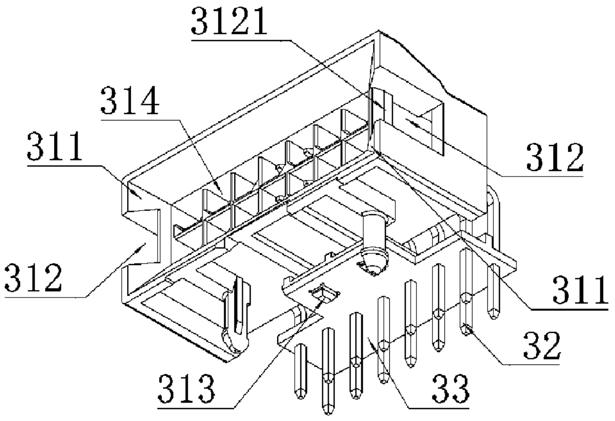
FIG. 11 is a three-dimensional structure diagram of a male connector of the fan connector.

As shown in FIGS. 4 and 11, the male connector 3 of the fan connector includes a male connector body. A rear side surface of the male connector body is provided with a square recess, a bottom surface of the recess is provided with plugging holes 314 cooperated with the plugging columns 26, the number of the plugging holes 314 is the same as the number of the plugging columns 26, and the positions of the plugging holes 314 and the position of the plugging columns 26 are in one-to-one correspondence. A PIN 32 is provided in the plugging hole 314, and the PIN 32 is of a right-angled bent structure and includes a horizontal part and a vertical part, the horizontal part being located in the plugging hole, and the vertical part extending downward in the vertical direction. When the plugging column 26 is plugged into the plugging hole 314, the PIN 32 is plugged into the female connector terminal 27.

As shown in FIGS. 4 and 11, a left side surface and a right side surface of the recess are respectively provided with a second inclined guide surface 311 extending obliquely outward and rearward, and projections of the two second inclined guide surfaces 311 in the horizontal plane together form a funnel shape opening toward the rear side.

The reason for this design is that the position of the female connector 2 on the fan frame 1 may be adaptively adjusted by the cooperating between the female connector body 21 and the second inclined guide surfaces 311 during plugging, thereby achieving accurate plugging of the male connector 3 and the female connector 2.

Based on the above-mentioned object, a distance between the first limiting column 211 and the second limiting column 222 is slightly greater than a thickness of the front side wall of the fan frame 1, that is, a positive tolerance is selected, so as to ensure a clearance fit between the first limiting column 211, the second limiting column 222 and the front side wall of the fan frame 1, which may avoid, after the female connector 2 is mounted, excessive friction between the first limiting column 211 and the second limiting column 222 and the front side wall of the fan frame 1 from affecting the position adjustment of the female connector 2 during plugging. However, due to the clearance fit between the first limiting column 211, the second limiting column 222 and the front side wall of the fan frame 1, a relative position between the female connector 2 and the fan frame 1 is not fixed before plugging, namely, the female connector 2 may move on the fan frame 1, which increases the difficulty of plugging.

Figure 5:
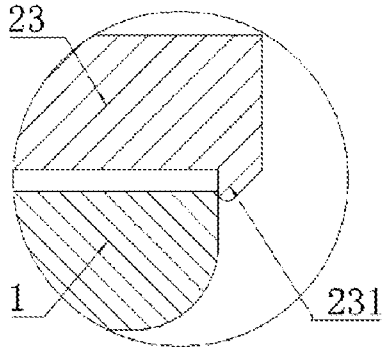
FIG. 5 is an enlarged structure diagram of part B in FIG. 4.
Figure 7:
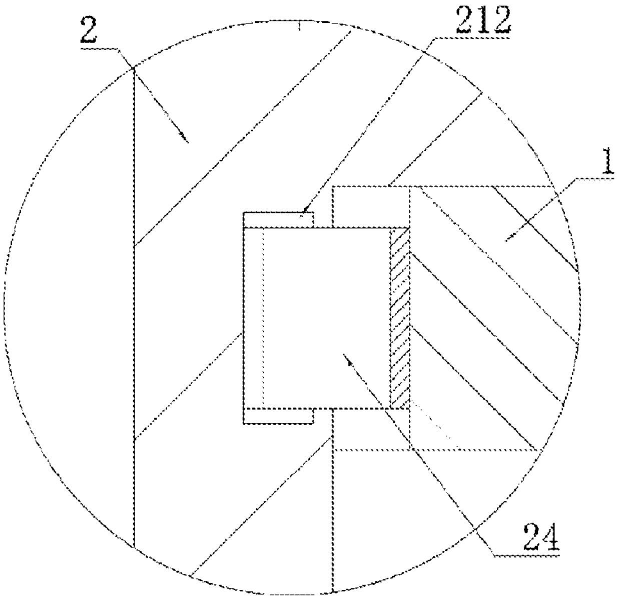
FIG. 7 is an enlarged structure diagram of part D in FIG. 4.
Figure 9:
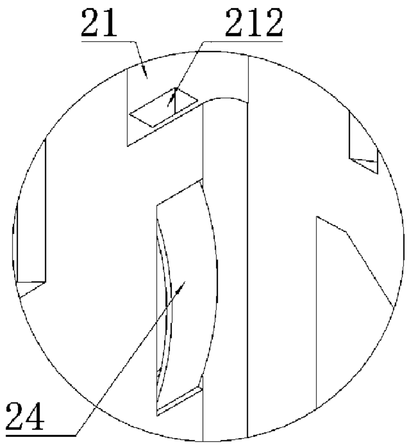
FIG. 9 is an enlarged structure diagram of part E in FIG. 8.

Therefore, as shown in FIG. 8, a right side surface of the limiting structure is provided with an elastic fixing plate 23 extending rightward, a right end of a front side surface of the elastic fixing plate 23 is provided with a positioning protrusion 231, and the front side wall of the fan frame 1 is provided with a positioning groove or a positioning hole cooperated with the positioning protrusion 231. In the embodiment, the right end of the front side surface of the elastic fixing plate 23 is provided with a hooking part, and the front side wall of the fan frame 1 is provided with a third avoiding hole 13 configured to accommodate the hooking part. As shown in FIGS. 8 and 9, a position, located between the first limiting column 211 and the second limiting column 222, on a right side surface of the female connector body 21 is provided with an arc-shaped elastic sheet 24. As shown in FIGS. 5 and 7, when the female connector 2 is mounted on the fan frame 1, the elastic sheet 24 is elastically pressed against the right side surface of the first avoiding hole 11, and the hooking part is pressed against a left side surface of the third avoiding hole 13 under the action of the elastic sheet 24.

Figure 10:
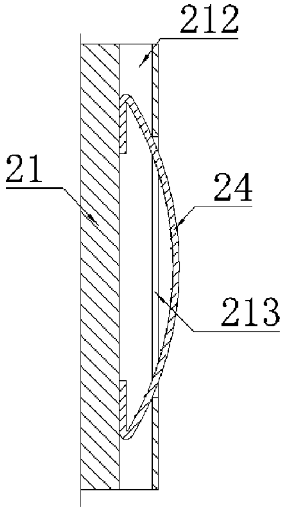
FIG. 10 is a schematic diagram of a mounting structure of an elastic sheet.

In some embodiments, as shown in FIG. 10, the female connector body 21 is provided with a first mounting hole 212 penetrating through the female connector body 21 in the vertical direction and having a square cross section, the right side surface of the female connector body 21 is provided with a fourth avoiding hole 213 extending leftward, the fourth avoiding hole 213 communicates with the first mounting hole 212, the elastic sheet 24 is provided in the first mounting hole 212, and an arc-shaped part of the elastic sheet 24 protrudes out to an exterior of the female connector body 21 through the fourth avoiding hole 213.

In some embodiments, as shown in FIG. 10, upper and lower ends of the arc-shaped part of the elastic sheet 24 are respectively provided with a sliding part which is folded inward and extends in the vertical direction.

Figure 6:
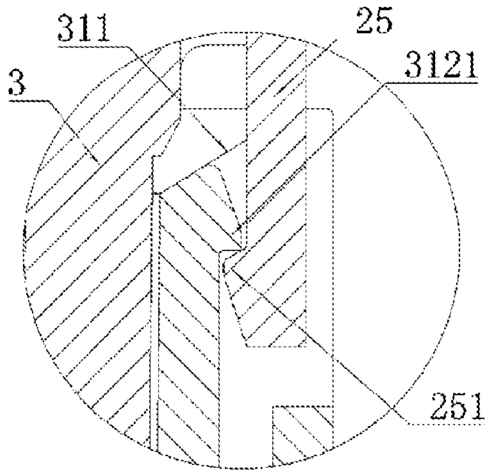
FIG. 6 is an enlarged structure diagram of part C in FIG. 4.

In some embodiments, as shown in FIGS. 8 and 11, left and right sides of the female connector body 21 are respectively provided with an elastic clamping plate 25, and a front end of an inner side surface of the elastic clamping plates 25 is provided with a first clamping part 251 projecting inward. Left and right sides of the male connector 3 are respectively provided with a second clamping part 3121 protruding outward and being cooperated with the first clamping part 251. As shown in FIGS. 3, 4 and 6, when the male connector 3 and the female connector 2 are in plugging fit, the first clamping part 251 and the second clamping part 3121 form a hooking fit, which not only meets the requirement of being a loose buckle during hot-plugging, but also meets the requirement of increasing the pull-out force to ensure the reliability of the connection between the male connector 3 and the female connector 2.

Figure 2:
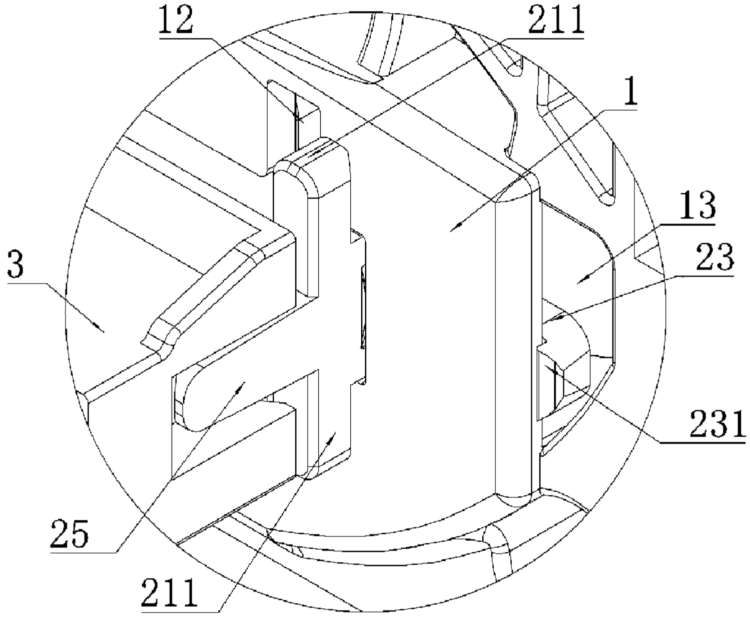
FIG. 2 is an enlarged structure diagram of part A in FIG. 1.

In some embodiments, as shown in FIG. 11, the left and right sides of the male connector 3 are respectively provided with a groove 312 configured to accommodate the suspended end of the elastic clamping plate 25, and the second clamping part 3121 is provided on a bottom surface of the groove 312 (namely, the surface perpendicular to the extending direction). As shown in FIG. 2, when the male connector 3 and the female connector 2 are in plugging fit, an outer side surface of the elastic clamping plate 25 located on the left side is flush with the left side surface of the male connector 3, and the outer side surface of the elastic clamping plate 25 located on the right side is flush with the right side surface of the male connector 3.

Figure 14:
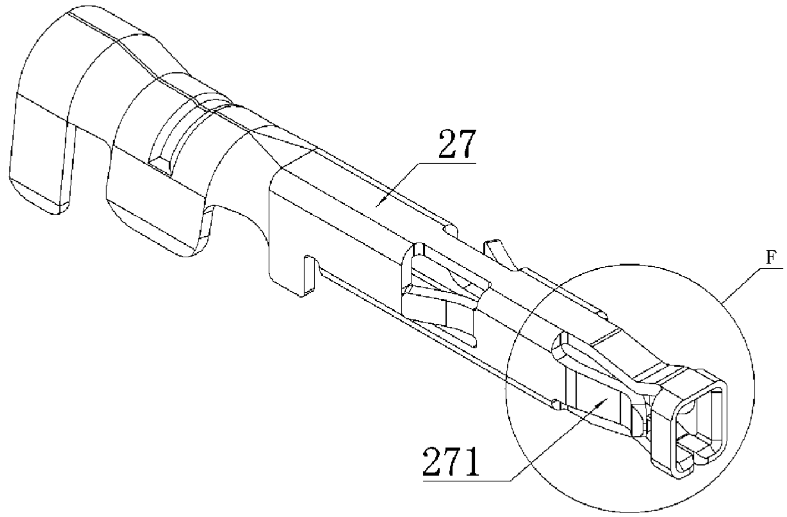
FIG. 14 is a three-dimensional structure diagram of a female connector terminal.
Figure 15:
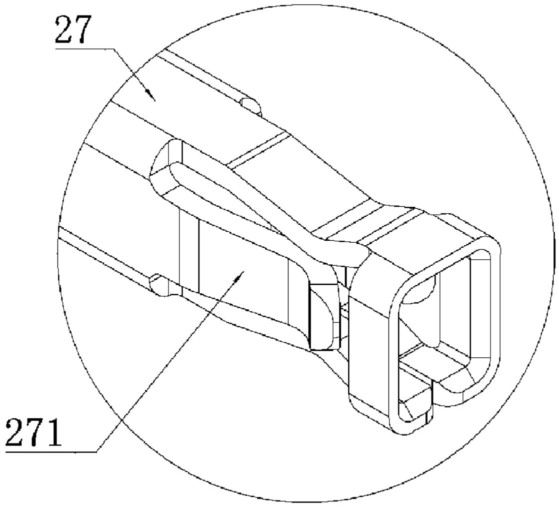
FIG. 15 is an enlarged structure diagram of part F in FIG. 14.
Figure 16:
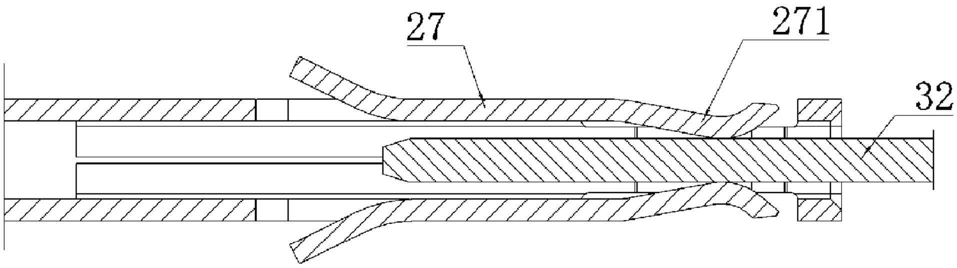
FIG. 16 is a schematic diagram of a plugging structure between the female connector terminal and a PIN.

In some embodiments, as shown in FIGS. 14, 15, and 16, left and right sides of a front end of the female connector terminal 27 are respectively provided with a fifth avoiding hole, and a rear side surface of the fifth avoiding hole is provided with an elastic contact plate 271 extending forward and being configured to clamp the PIN 32. In some embodiments, as shown in FIG. 16, a middle part of the elastic contact plate 271 is provided with a bent part bent inward, and a minimum distance between the two bent parts is smaller than the dimension of the PIN 32 in the transverse direction.

Figure 12:
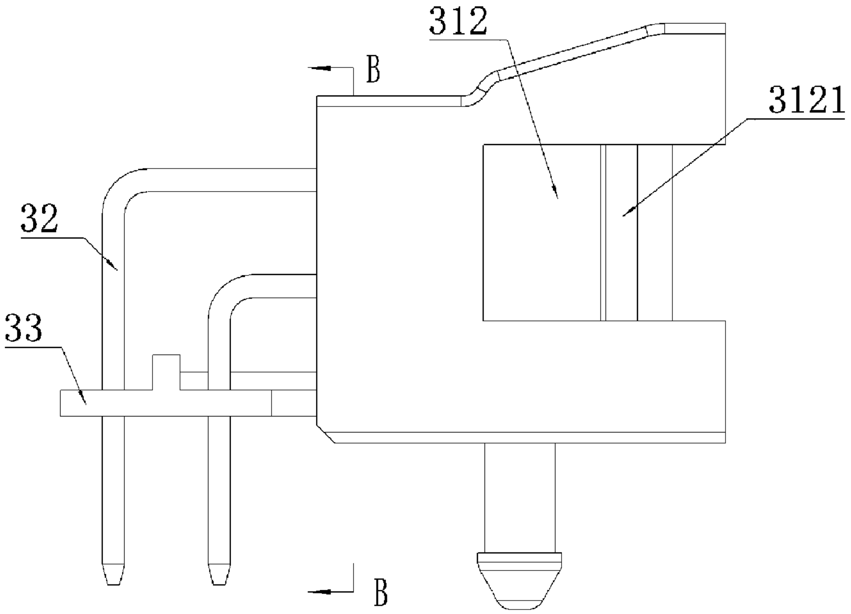
FIG. 12 is a side view of the male connector of the fan connector.
Figure 13:
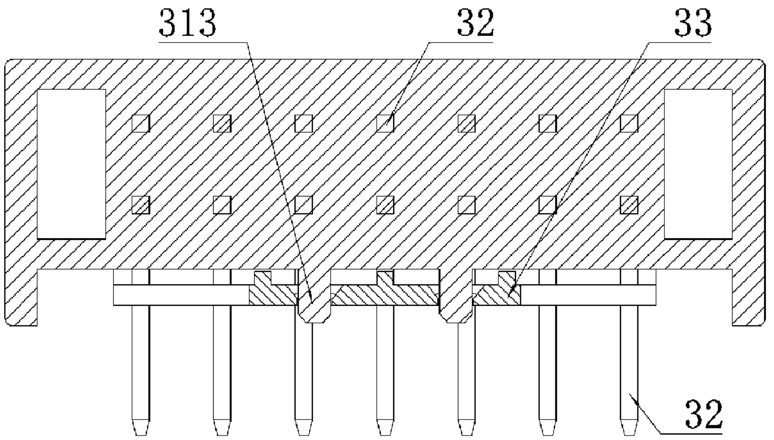
FIG. 13 is a B-B cross-sectional view in FIG. 12.

In some embodiments, as shown in FIGS. 11, 12 and 13, the front side of the male connector body is fixedly provided with a pin fixing plate 33 configured to fix the PIN 32, the pin fixing plate 33 is provided with a jack configured to accommodate the vertical part of the PIN 32, and the vertical part of the PIN 32 is plugged into the jack.

In some embodiments, as shown in FIGS. 12 and 13, a lower side surface of the male connector body is provided with a fixing column 313, a rear end of the pin fixing plate 33 extends below the male connector body, the pin fixing plate 33 is provided with a fixing hole cooperated with the fixing column 313, and the fixing column 313 and the fixing hole are fixedly connected by an interference fit.

Some embodiments provide another tool-free mounting structure for a fan connector. A limiting structure is a square limiting baffle 221, and an upper side, a lower side, a left side and a right side of the limiting baffle 221 respectively protrudes from the outer side of the female connector body 21. In the embodiment, the remaining structural components of the tool-free mounting structure for the fan connector are the same as the corresponding structural components of the tool-free mounting structure for the fan connector described in Embodiment 1, which will not be elaborated.

The present application has the following beneficial effects.

1. The mounting structure achieves the tool-free mounting of the female connector of the fan connector, and has the advantages of quick and convenient mounting and dismounting and safe and reliable use, thereby facilitating the improvement of the working efficiency, and the subsequent maintenance.
2. By providing the elastic sheet, a mounting position of the female connector of the connector relative to the fan frame has a certain floating space, so as to compensate a positioning error caused by a machining error, thereby improving the accuracy of positioning and facilitating the mounting and plugging.
3. A fixing structure is provided between the male connector and the female connector of the connector, and clamping and dismounting of the fixing structure are achieved at the same time when the male connector of the connector is plugged and unplugged, which is convenient to use.
4. By providing the elastic contact plates on the female connector terminal, on the one hand, the reliable contact between the PIN and the female connector terminal is ensured, and on the other hand, the insertion and extraction force is significantly reduced, thereby facilitating the mounting and maintenance in the future.
5. By providing the pin fixing plate configured to fix the PINs on the male connector of the connector, a relative positional relationship between the PINs is effectively ensured, and the phenomenon of bending the PINs is avoided.
6. A distance between the first limiting columns, second limiting columns and a limiting plate in the female connector of the connector is reasonable, which facilitates the improvement of the structural strength of a mold and facilitates machining.

The invention claimed is:

1. A tool-free mounting structure for a fan connector, comprising a fan frame and a fan connector, the fan connector comprising a male connector and a female connector, wherein a front side wall of the fan frame is provided with a first avoiding hole, and a front end of the female connector extends to a front side of the fan frame through the first avoiding hole;

a rear end of the female connector is provided with a limiting structure, a position, located at a front side of the limiting structure, on the female connector is provided with a first limiting column, the front side wall of the fan frame is sandwiched between the first limiting column and the limiting structure, and the front side wall of the fan frame is provided with a second avoiding hole configured to allow the first limiting column to pass through; and left and right ends of a rear side surface of the male connector are respectively provided with a second inclined guide surface cooperated with the female connector;

wherein a projection of the first limiting column in a horizontal plane is square, and a right side of a rear side surface of the first limiting column is provided with a first inclined guide surface.

2. The tool-free mounting structure for the fan connector according to claim 1, wherein left and right ends of upper and lower side surfaces of the female connector are respectively provided with the first limiting column extending in a vertical direction.

3. The tool-free mounting structure for the fan connector according to claim 1, wherein the female connector comprises a female connector body, the limiting structure is provided at a rear side of the female connector body, left and right ends of upper and lower side surfaces of the female connector body are respectively provided with the first limiting column extending in a vertical direction, a dimension of the female connector body in a transverse direction is smaller than a dimension of the first avoiding hole in the transverse direction, so that the female connector is able to slide left and right with respect to the fan frame under a guide action of the first limiting column and the limiting structure.

4. The tool-free mounting structure for the fan connector according to claim 1, wherein a rear side surface of the male connector is provided with a square recess, a bottom surface of the recess is provided with a plugging hole cooperated with a plugging column of the female connector, a left side surface and a right side surface of the recess are respectively provided with the second inclined guide surface extending obliquely outward and rearward, and projections of the two second inclined guide surfaces in a horizontal plane together form a funnel shape opening toward the rear side.

5. The tool-free mounting structure for the fan connector according to claim 1, wherein a right side surface of the limiting structure is provided with an elastic fixing plate, a right end of a front side surface of the elastic fixing plate is provided with a hooking part, and the front side wall of the fan frame is provided with a third avoiding hole configured to accommodate the hooking part.

6. The tool-free mounting structure for the fan connector according to claim 1, the first avoiding hole and the second avoiding hole are communicated, and the first avoiding hole and the second avoiding hole together form an avoiding mounting groove penetrating through the front side wall in the front-rear direction.

7. The tool-free mounting structure for the fan connector according to claim 1, wherein a right side surface of the limiting structure is provided with an elastic fixing plate, the elastic fixing plate is provided with a positioning protrusion, the front side wall of the fan frame is provided with a positioning groove or a positioning hole cooperated with the positioning protrusion, and a position, located between the limiting structure and the first limiting column, on a right side surface of the female connector is provided with an elastic sheet.

8. The tool-free mounting structure for the fan connector according to claim 7, wherein the female connector is provided with a first mounting hole extending in a vertical direction, the right side surface of the female connector is provided with a fourth avoiding hole, the elastic sheet is provided in the first mounting hole, and an arc-shaped part of the elastic sheet protrudes out to an exterior of the female connector through the fourth avoiding hole.

9. The tool-free mounting structure for the fan connector according to claim 8, wherein upper and lower ends of the arc-shaped part of the elastic sheet are respectively provided with a sliding part which is folded inward and extends in the vertical direction.

10. The tool-free mounting structure for the fan connector according to claim 1, wherein s left and right sides of the female connector are respectively provided with an elastic clamping plate, the elastic clamping plate is provided with a first clamping part, left and right sides of the male connector are respectively provided with a second clamping part cooperated with the first clamping part.

11. The tool-free mounting structure for the fan connector according to claim 10, wherein the left and right sides of the male connector are respectively provided with a groove, and the second clamping part is provided on a bottom surface of the groove.

12. The tool-free mounting structure for the fan connector according to claim 1, wherein the female connector is provided with a female connector terminal, left and right sides of a front end of the female connector terminal are respectively provided with a fifth avoiding hole, and a rear side surface of the fifth avoiding hole is provided with an elastic contact plate configured to clamp a PIN.

13. The tool-free mounting structure for the fan connector according to claim 12, wherein the female connector comprises a female connector body, a front side surface of the female connector body is provided with a plugging column extending forward in a longitudinal direction, a front end surface of the plugging column is provided with a second mounting hole extending backward in the longitudinal direction, and the second mounting hole successively penetrates through the plugging column and the female connector body from front to back, the female connector terminal is located in the second mounting hole.

14. The tool-free mounting structure for the fan connector according to claim 12, the female connector terminal comprises two elastic contact plates, a middle part of each elastic contact plate is provided with a bent part bent inward, and a minimum distance between the two bent parts is smaller than a dimension of the PIN in a transverse direction.

15. The tool-free mounting structure for the fan connector according to claim 1, wherein a front side of the male connector is fixedly provided with a pin fixing plate, and the pin fixing plate is provided with a jack configured to accommodate the PIN.

16. The tool-free mounting structure for the fan connector according to claim 15, the male connector comprises a male connector body, a lower side surface of the male connector body is provided with a fixing column, a rear end of the pin fixing plate extends below the male connector body, the pin fixing plate is provided with a fixing hole cooperated with the fixing column, and the fixing column and the fixing hole are fixedly connected by an interference fit.

17. The tool-free mounting structure for the fan connector according to claim 1, wherein the female connector comprises a female connector body, the limiting structure is provided at a rear side of the female connector body, the limiting structure includes a baffle, a dimension of the baffle in a transverse direction is greater than a dimension of the female connector body in the transverse direction.

18. The tool-free mounting structure for the fan connector according to claim 17, wherein left and right ends of upper side surface and lower side surface of the baffle are respectively provided with a second limiting column extending in a vertical direction, and the second limiting column is located at an outer side of the first limiting column.

19. The tool-free mounting structure for the fan connector according to claim 18, wherein a distance between the first limiting column and the second limiting column is greater than a thickness of the front side wall of the fan frame.

* * * * *